Oct. 11, 1949.  F. J. FOUST ET AL  2,484,560
IGNITION TIMER TESTING APPARATUS
Filed June 3, 1948  4 Sheets-Sheet 1
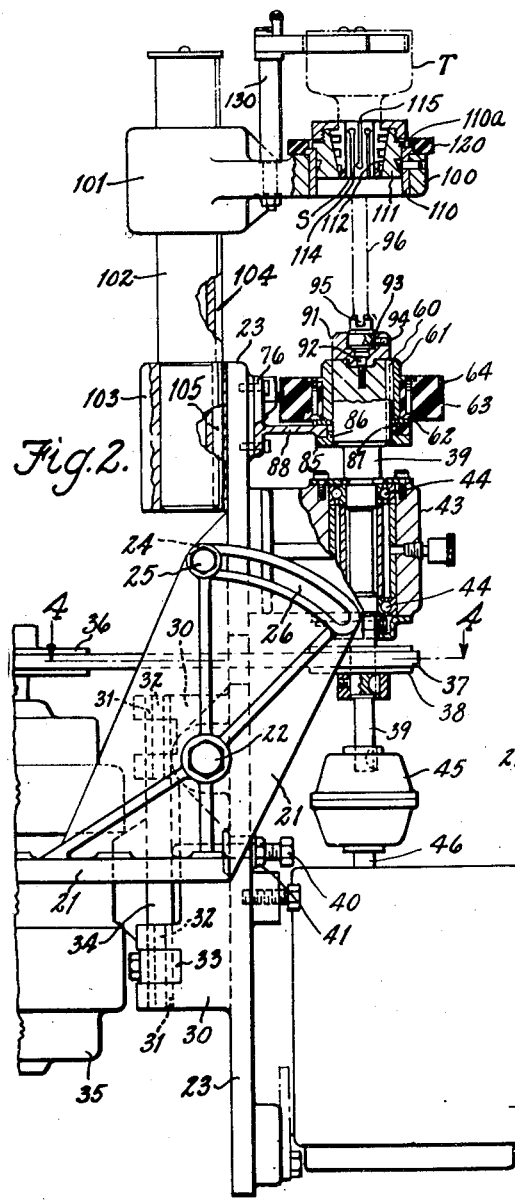
Fig.2.
Fig.3.
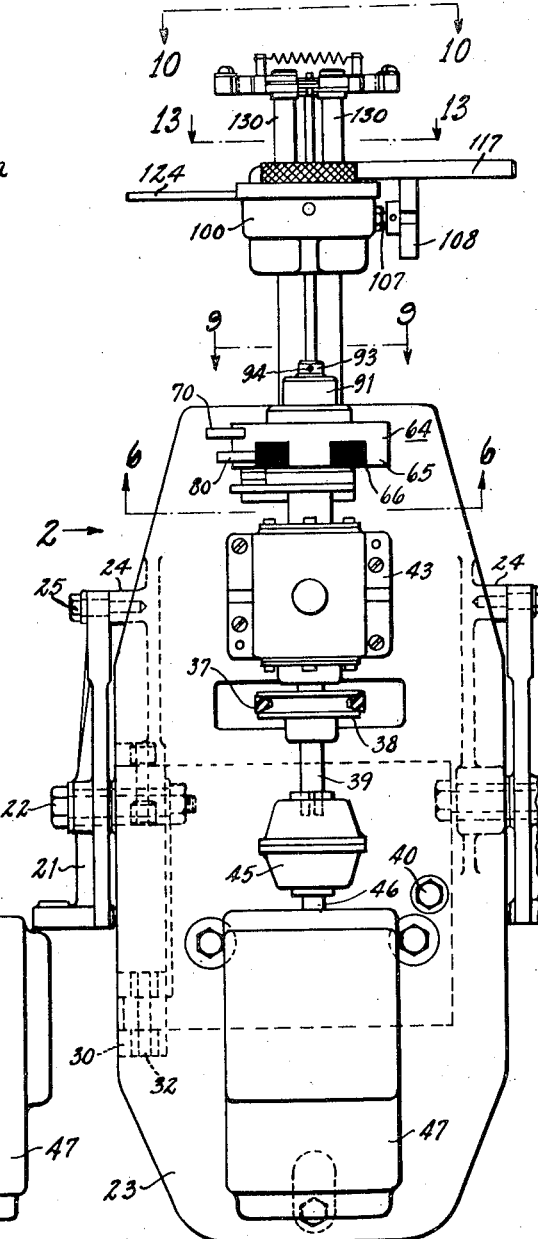
Fig.1.
INVENTORS
Floyd J. Foust
Oliver W. Childress Jr., Ralph C. Whitchel
BY Spencer Hardman & Fehr
their attorneys Oct. 11, 1949.  F. J. FOUST ET AL  2,484,560
IGNITION TIMER TESTING APPARATUS
Filed June 3, 1948  4 Sheets-Sheet 2
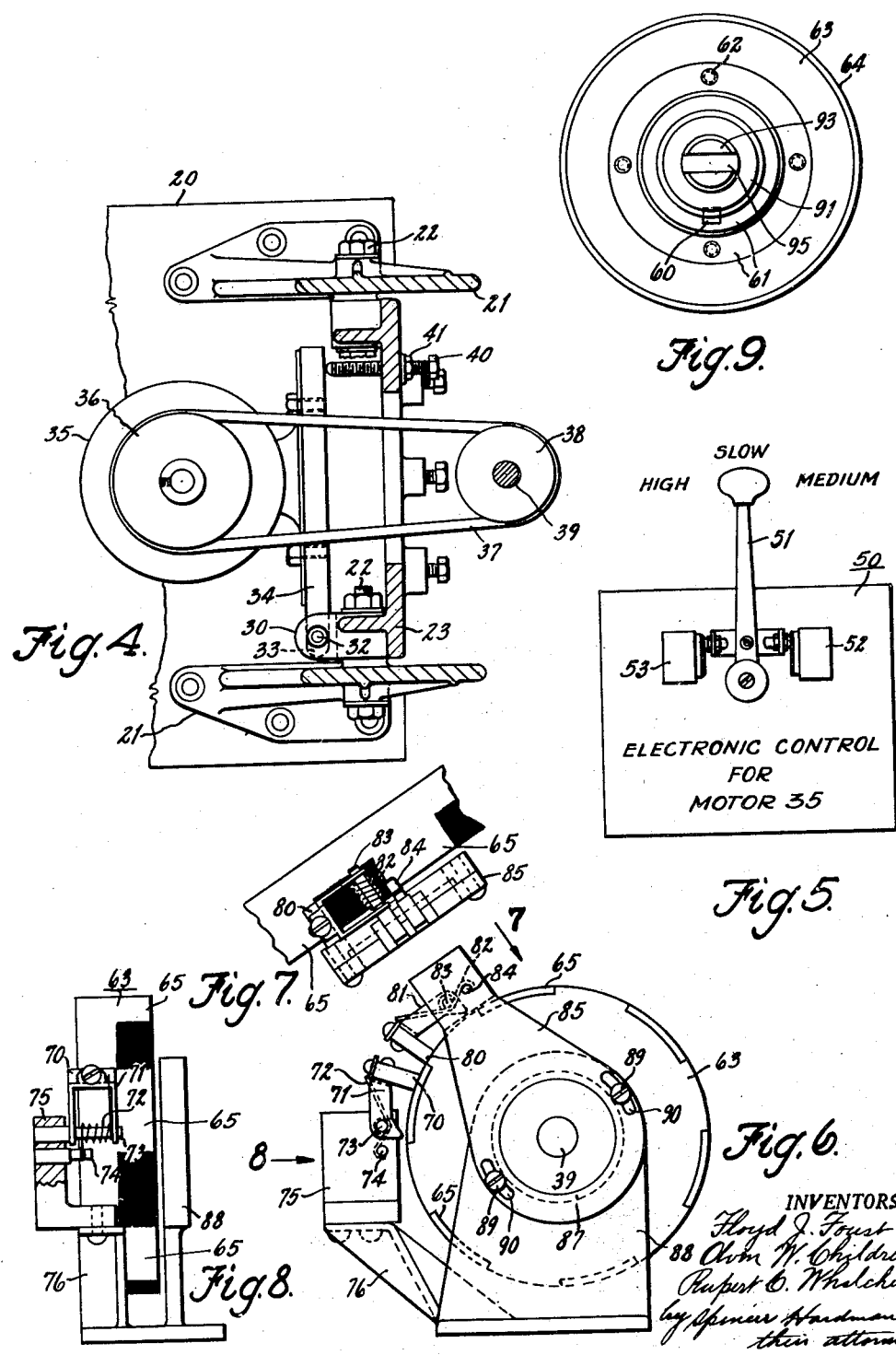

Oct. 11, 1949.  F. J. FOUST ET AL  2,484,560
IGNITION TIMER TESTING APPARATUS
Filed June 3, 1948  4 Sheets-Sheet 3
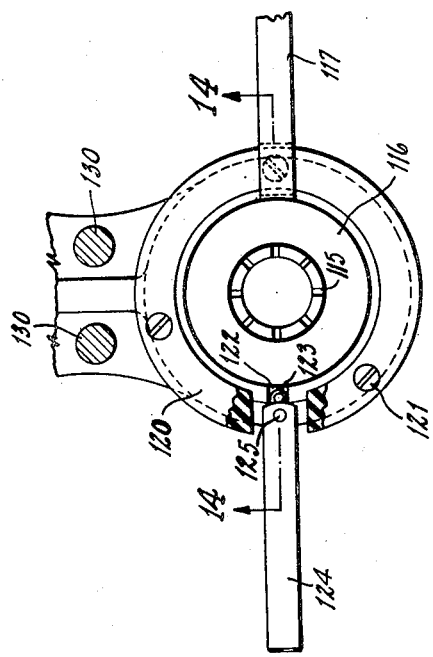
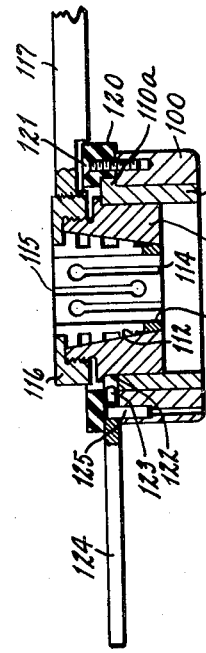
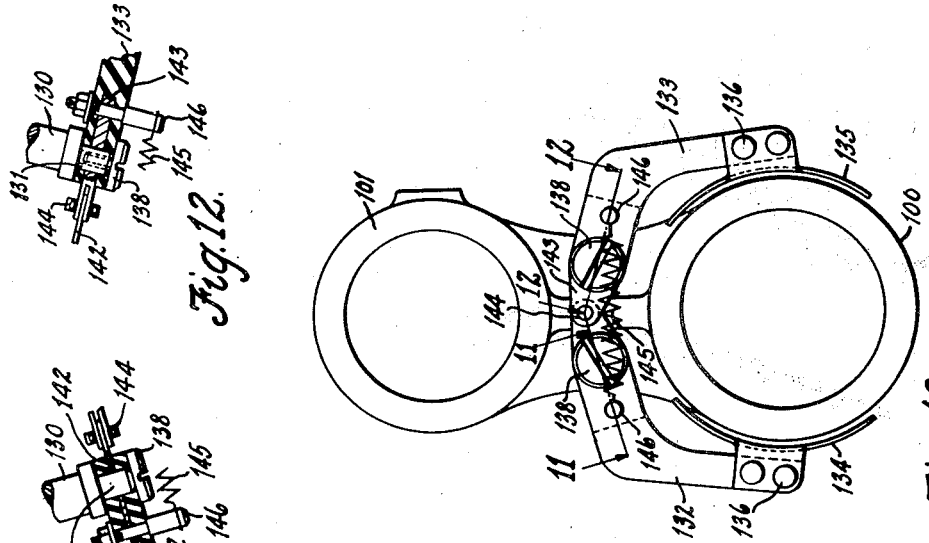
Floyd J. Foust
INVENTORS
BY
their attorneys Patented Oct. 11, 1949

2,484,560

UNITED STATES PATENT OFFICE 2,484,560

IGNITION TIMER TESTING APPARATUS

Floyd J. Foust, Olven W. Childress, Jr., and Rupert C. Whelchel, Anderson, Ind., assignors to General Motors Corporation, Detroit, Mich., a corporation of Delaware Application June 3, 1948, Serial No. 30,946

4 Claims. (Cl. 175—183)

1

This invention relates to equipment for testing spark advance of ignition timers. The object of the invention is to provide a visual indication of spark timing over the range of speeds to which the timer would be subjected in service. The visual trace is on the screen of a cathode ray oscilloscope having one of its plate pairs subjected to a voltage which increases as spark advance increases and having the other pair of its plates connected to a voltage which is proportional to speed. In front of the cathode ray screen there is placed a card showing the pattern limits for the particular type of ignition timer under test. If the trace on the screen is within those limits, the timer passes inspection.

Further objects and advantages of the present invention will be apparent from the following description, reference being had to the accompanying drawings, wherein a preferred embodiment of the present invention is clearly shown.

In the drawings:

Fig. 1 is a front elevation of a device for supporting an ignition timer and for causing rotation of its timer cam shaft at various speeds.

Figs. 2 and 3 together constitute a view in the direction of arrow 2 of Fig. 1, certain parts being in vertical longitudinal section.

Fig. 4 is a sectional view on line 4—4 of Fig. 2.

Fig. 5 is a diagrammatic view showing motor control.

Fig. 6 is a view taken on line 6—6 of Fig. 1.

Fig. 7 is a view in the direction of arrow 7 of Fig. 6.

Fig. 8 is a view shown in the direction of arrow 8 of Fig. 6.

Fig. 9 is a view on the line 9—9 of Fig. 1.

Fig. 10 is a view on the line 10—10 of Fig. 1.

Figure 15:
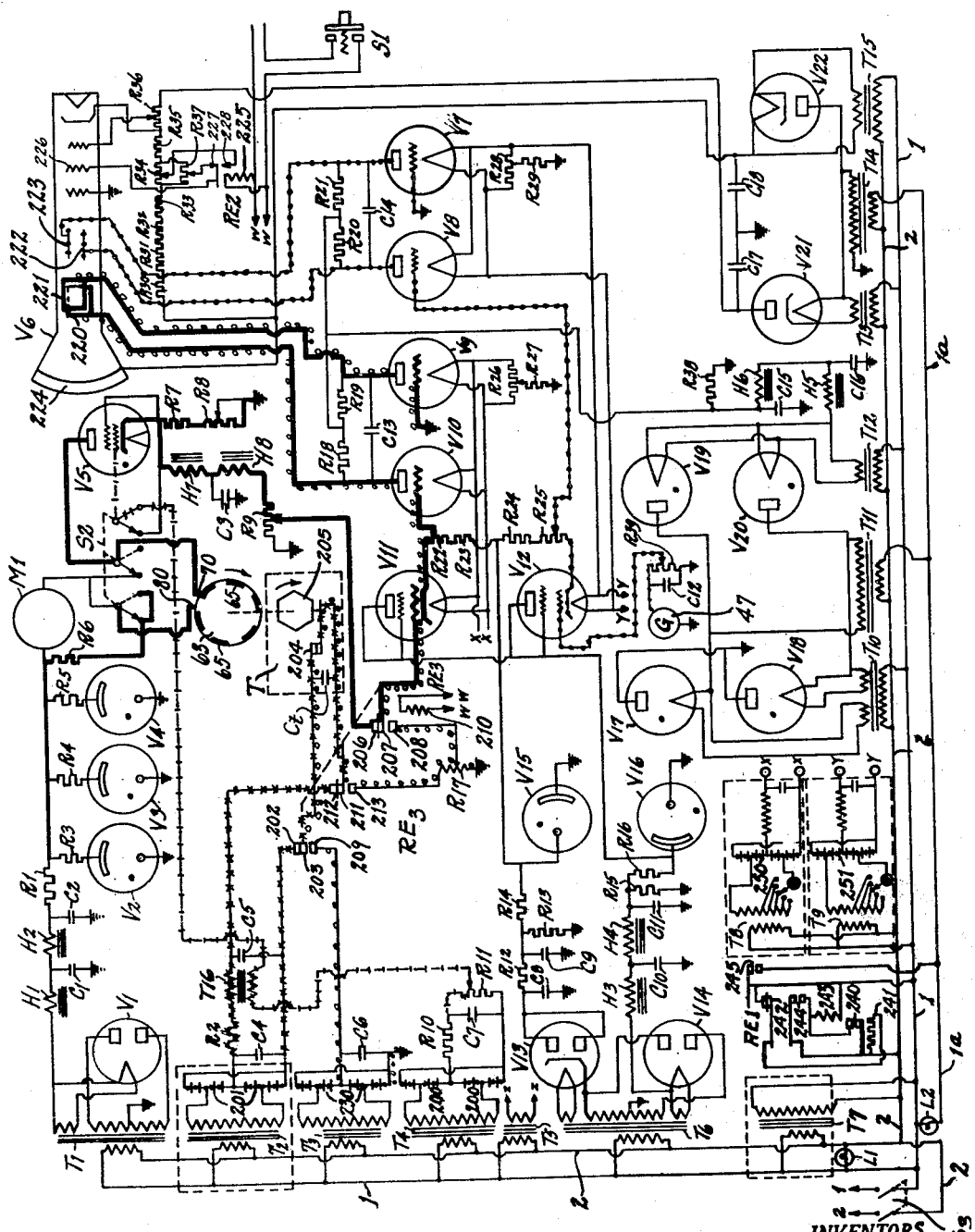

Figs. 11 and 12 are sectional views on the lines 11—11 and 12—12 of Fig. 10.

Fig. 13 is a view, partly in section, on line 13—13 of Fig. 1.

Fig. 14 is a sectional view on the line 14—14 of Fig. 13.

Fig. 15 is a wiring diagram of electric circuits included in the present invention.

Referring to Figs. 1, 2 and 4, a table 20 supports brackets 21 which support screws 22 which provide trunnions for a frame 23 having lugs 24 each for threadedly engaging screws 25 passing through arcuate slots 26 in brackets 21. By loosening the screws 25, the frame can be tilted to some angle convenient for the operator and secured in the desired positon by tightening the screws 25.

As shown in Figs. 1, 2 and 4, the frame 23 pro-

2 vides notched lugs 30, each of the bifurcations of which carries a bearing 31 for a hinge pin 32. The two pins 32 pass through hinge lugs 33 integral with a plate 34 upon which an electric motor 35 is mounted. Motor 35 drives a pulley 36 connected by belt 37 with a pulley 38 attached to a shaft 39. The belt 37 is tightened by threading a screw 40 through the frame 23 and against the plate 34 and the screw is locked by nut 41.

To the frame 23 there is attached a bearing bracket 43 supporting roller bearings 44 for the shaft 39 which carries the pulley 38. A coupling 45 connects the shaft 39 with the shaft 46 of a tachometer D. C. generator 47. The speed of the electric motor is controlled by an electronic controller 50 of Fig. 5 and is indicated by the voltage of the tachometer generator 47. Controller 50 is a model electronic controller having a handle 51 which, in the vertical position, effects operation of the motor 35 at very slow speed only sufficient to facilitate the connection of the shaft of timer T with coupling 93 (Fig. 2). When the handle 51 is moved right to operate switch 52, the motor 35 operates at a medium speed, 300 R. P. M. for example, at which the speed-responsive automatic spark advance mechanism of timer T is about to begin to operate. When the handle 51 is moved left to operate switch 53, the motor 35 accelerates to high speed. When handle 51 is moved to vertical position, the motor 35 decelerates.

The shaft 39 is connected by a key 60 with a hub 61 which screws 62 connect with a non-conducting disc 63 which supports a metal band or ring 64 connected with segments 65 flush with the outer surface 66 of the disc 63. The ring 64 is contacted by a brush 70 (Fig. 6) attached to a brush holder 71 which a spring 72 urges clockwise about its pivot 73, one end of said spring bearing against the brush holder, the other against a stud 74. Pin 73 and stud 74 are attached to a non-conducting block 75 supported by bracket 76 attached to the frame 23. The segments 65 are successively engaged by a brush 80 attached to a holder 81 which a spring 82 urges counterclockwise about a pivot pin 83, one end of said spring bearing against the holder 81 and the other against a stud 84. The pin 83 and stud 84 are insulatingly supported by an arm 85 which (Figs. 2 and 6) has an integral annular flange 86 journaled within an opening 8 in plate 88 which is integral with bracket 76. The location of arm 85 relative to shaft 39 is adjustable by providing screws 89 which pass through arcuate slots 90 in the arm 85 and which are threaded into the plate 88.

The shaft 39 supports a cuplike member 91 attached to the shaft by screw 92 and rotating therewith. The cup 91 receives a coupling 93 secured by a set screw 94, said coupling having the proper slot 95 for receiving a tongue in the lower end of the timer shaft 96 which extends downwardly from the timer T indicated in dot-dash lines in Fig. 2.

The shank S of the housing of the timer T is received by a workholder 100 which is integral with a sleeve 101 which surrounds a post 102 attached to a tubular part of the frame 103. Rod 102 has a longitudinal groove 104 for receiving a key 105, thereby preventing rotation of the workholder about the rod 102. The workholder 100 is clamped to the rod 102 by a screw 107 to which a hand wheel 108 is attached. The holder 100 receives a bushing 110 which supports a bushing 111 having a conical inner surface 112 which receives a chuck 113 which is split in opposite directions as indicated by the cuts 114 and 115 (Figs. 2 and 14), thereby providing wedge portions which can be forced down into the conical surface 112 and be caused to grip the shank S of the timer. This wedging action is effected by screwing down a nut 116 threaded on the upper end of the bushing 111, said nut being attached to the handle 117. The bushing 110 has a flange 110a resting upon a holder 100 and it is retained by a ring 120 attached to the holder by screws 121. The flange 110a has a notch 122 which receives a pin 123 carried by a handle 124 pivoted on a pin 125.

Referring to Figs. 10, 11 and 12, the holder 100 supports rods 130, each having a reduced portion 131 providing pivotal supports for non-conducting levers 132 and 133 to which rivets 136 attach arcuate metal contacts 134 and 135 respectively for engaging terminals of the timer in case it has two insulated terminals. If it has but one insulated terminal, one of the connectors would engage it and the other would engage the side of the timer which would serve as a ground connection in the insulation of the timer on an engine. The levers 132 and 133 are retained on the rods 130 by screws 138 threaded into the rods. Levers 132 and 133 provide respectively metal inserts 142 and 143 which serve as lever arms, said arms being connected by a pin 144 passing through a slot in one of the arms. The levers 132 and 133 are connected by a spring 145 whose ends are connected with studs 146 carried by these levers. When the studs 146 are below a center line joining the centers of the screws 138 as viewed in Fig. 10, the spring 145 urges the contactors 134 and 135 toward each other; and, when the levers 132 and 133 are moved outward so that the studs 146 are above a center line of the centers of the screws 138, the spring 145 will urge the contactors apart. When the timer T is located for test as shown in Figs. 2 and 10, the levers 132 and 133 are moved manually into the position shown so that the contactors 134 and 135 will engage the timer terminals. After the test, the levers 132 and 133 are manually retracted to an extent such that the spring 145 retains the levers in retracted position. The contactors, when engaging the timer terminals, connect the timer with the test circuit as shown in Fig. 15.

The following lists parts of the circuit (Fig. 15) and specifications which have been found satisfactory.

C1  16 mfd. 450 volt condenser
C2  16 mfd. 450 volt condenser
C3  16 mfd. 450 volt condenser
C4  4,000 mfd. 25 volt condenser
C5  16 mfd. 450 volt condenser
C6  4,000 mfd. 25 volt condenser
C7  50 mfd. 150 volt condenser
C8  16 mfd. 450 volt condenser
C9  16 mfd. 450 volt condenser
C10 16 mfd. 450 volt condenser
C11 16 mfd. 450 volt condenser
C12 4,000 mfd. 25 volt condenser
C13 .003 mfd. 2500 volt condenser
C14 .003 mfd. 2500 volt condenser
C15 2 mfd. 3,000 volt condenser
C16 2 mfd. 3,000 volt condenser
C17 1 mfd. 3,000 volt condenser
C18 1 mfd. 3,000 volt condenser
H1  150 milli-amps choke
H2  150 milli-amps choke
H3  8 henrys 100 milli-amps choke
H4  8 henrys 100 milli-amps choke
H5  8 henrys 100 milli-amps 7,000 v. ins. choke
H6  8 henrys 100 milli-amps 7,000 v. ins. choke
H7  100 henrys special 7000 turns (#32 wire) choke
H8  100 henrys special 7,000 turns (#32 wire) choke
M1  0 to 3 milli-ammeter meter
R1  2500 ohms 50 watt resistor
R2  4 ohms 50 watt resistor
R3  25 ohms 20 watt resistor
R4  25 ohms 20 watt resistor
R5  25 ohms 20 watt resistor
R6  meter shunt 60 milli-amps
R7  2,000 ohms 10 watt resistor
R8  1,000 ohms 4 watt resistor
R9  2,000 ohms wire wound potentiometer
R10 500 ohms 10 watt resistor
R11 500 ohms 1 watt resistor
R12 25,000 ohms 20 watt resistor
R13 50,000 ohms 25 watt resistor
R14 6,000 ohms 20 watt resistor
R15 100,000 ohms 25 watt resistor
R16 10,000 ohms 20 watt resistor
R17 500 ohms 1 watt resistor
R18 380,000 ohms 10 watt resistor
R19 380,000 ohms 10 watt resistor
R20 380,000 ohms 10 watt resistor
R21 380,000 ohms 10 watt resistor
R22 25,000 ohms 1 watt resistor
R23 100,000 ohms 10 watt resistor
R24 100,000 ohms 10 watt resistor
R25 25,000 ohms 1 watt resistor
R26 25 ohms 25 watt resistor
R27 4,000 ohms 25 watt resistor
R28 25 ohms 25 watt resistor
R29 4,000 ohms 25 watt resistor
R30 2 megohm 2 watt resistor
R31 2 megohm 2 watt resistor
R32 2 megohm 2 watt resistor
R33 2 megohm 2 watt resistor
R34 500,000 ohm 1 watt resistor
R35 1 megohm 2 watt resistor
R36 250,000 ohms 1 watt resistor
R37 500,000 ohms 1 watt resistor
R38 50,000 ohms 50 watt resistor
R39 1 megohm 1 watt resistor
RE1 305–B Advance relay
RE2 454 type 115 volt A. C. Advance relay
RE3 979–A type 115 volt A. C. Advance relay
S1  Normally open micro-switch
T1  800 volts center tap 200 milli-amp. transformer
T2  Mallory 5535–B battery charger
T3  30 volts 2 amp transformer
T4  14 volts 2 amp transformer T5   6.3 volts 1 amp transformer
T6   700 volts center tap transformer
T7   500 VA. voltage regulator
T8   6VA10 Mallory rectopower supply
T9   6VA10 Mallory rectopower supply
T10  5 volts 10 amp transformer
T11  1800 V. C. T. 225 milli-amp transformer
T12  2.5 volts 10 amp transformer
T13  2.5 volts 1 amp transformer
T14  T45158 transformer
T15  2.5 volt 1 amp transformer
T16  Thermador CS8763
V1   83 full wave mercury vapor rectifier
V2   OD3 voltage regulator
V3   OD3 voltage regulator
V4   OD3 voltage regulator
V5   2050 Thyratron
V6   14 AP1 cathode ray tube Du Mont
V7   811 transmitting triode
V8   811 transmitting triode
V9   811 transmitting triode
V10  811 transmitting triode
V11  6V6 beam power amplifier
V12  6V6 beam power amplifier
V13  6x5 full wave high vacuum rectifier
V14  83 full wave mercury vapor rectifier
V15  OC3 voltage regulator
V16  OC3 voltage regulator
V17  816 half wave mercury vapor rectifier
V18  816 half wave mercury vapor rectifier
V19  816 half wave mercury vapor rectifier
V20  816 half wave mercury vapor rectifier
V21  2x2 half wave high vacuum rectifier
V22  2x2 half wave high vacuum rectifier
L1   Dialco pilot light #9100 (green)
L2   Dialco pilot light #9100 (red)

Transformer T1 with rectifier V1, filter comprising chokes H1, H2 and condensers C1, C2, supplies direct current to regulator tubes V2, V3, V4 which supply plate current to tube V5 through the circuit in heavy lines including switch S2 with its contacts in right positions, the rotating disc 63 with its segments 65 (Fig. 8) engageable with brush 80 and its ring engaged by brush 70. Transformer T4 with rectifier cells 200 provides negative bias for the control grid of tube V5 through the circuit indicated by dashes separated by short transverse lines. The bias by this circuit alone is such that tube V5 will not ionize. The signal by this circuit is controlled by a breaker supply circuit indicated by small $x$'s on a continuous line and including connections with rectifier cells 201 connected with transformer T2, and connected with the primary winding of transformer T16, contacts 202, 203 of relay RE3 and the circuit breaker contacts 204 of the tested timer T opened by a timer cam 205 and contacts 211, 212 of relay RE3. When the contacts 204 open, the timer condenser C$t$ receives a charge due to voltage impressed by the rectifier 201 and by the energy released by the primary winding of transformer T16; and, immediately thereafter, the timer condenser C$t$ discharges through the primary winding of transformer T16, thereby inducing a voltage in its secondary winding which causes grid bias to be decreased negatively so that tube V5 is ionized to make it conducting. The bias value on V5 determined by R11 for coarse adjustment and by R8 for fine adjustment is such that V5 will not ionize or conduct until a positive signal is produced by discharge of condenser C$t$ when the timer contacts 204 open.

The details of timer T (Figs. 2 and 15) are not shown but it will be understood that its cam 205 is driven by its shaft 96 through a speed responsive device such as shown in Fitzsimmons Patent #1,753,564, issued April 8, 1930, which automatically changes the angular relation between the cam and the shaft in a manner such that timer contacts 204 are separated by the cam 205 further in advance of engine top-dead-center as the speed increases above a certain medium value. In Fig. 15, the direction of rotation of cam 205 and disc 63 rotating therewith is clockwise. The housing of timer T is so located by the chuck (Figs. 13 and 14) which can be turned for fine adjustment by lever 124 that, at a medium speed of 300 R. P. M., for example, the cam 205 will begin to separate the contacts 204 just as a segment 65 leaves brush 80 (Fig. 6). Therefore there is a brief instant when tube V5 passes current. This is indicated by the appearance of a flash on the screen of oscilloscope V6. The chuck supporting the timer housing is adjusted until this flash appears when the speed of the timer shaft is that at which the automatic advance mechanism of the timer begins to function.

When the timer shaft is accelerated by moving lever 51 (Fig. 5) to left position, the time between the instant of separation of timer contacts 204 and the instant a segment 65 leaves brush 80 increases. Therefore that portion of the total time of engagement of brush 80 with a segment 65 during which contacts 204 are open increases with increase of speed of the timer shaft above medium speed. Consequently the tube V5 passes current for increasing periods during engagement of brush 80 with the segments 65 as speed increases. The increment of time of current passed by tube V5 increases from a very narrow value just as the spark advances mechanism begins to function to wider values or rectangular current waves which are increasingly wider as speed increases. Therefore, the width of the current waves is substantially proportional to spark advance.

Part of the current passed by tube V5 passes to ground through resistances R7 and R8, the latter being adjustable for a fine adjustment for controlling the critical point for ionizing tube V5. This adjustment also limits the height of the wave form so that the beam will be on the screen of the cathode ray oscilloscope. Adjustable resistance R9 controls the amount of D. C. voltage impressed on the grid of the tube V11 for amplification thereby and by tubes V10 and V9 in the circuit of the plates 220 and 221 of oscilloscope V6. The D. C. signal received by plates 220, 221 is the average voltage development across R9. Chokes H7 and H8 and condenser C3 provide means for averaging the current flow. The greater the conducting time of tube V5 becomes, the higher the average voltage developed across R9 becomes. Consequently, average voltage amplified and impressed on plates 220, 221 increases as spark advance increases. The relation of the inductances of chokes H7 and H8 to the capacity of C3 must be such that for the varying frequencies encountered over the range of speeds of the time, the cathode ray oscilloscope will show a dot on its screen.

Horizontal plates 222, 223 of the oscilloscope receive voltages proportional to timer shaft speed. Tachometer D. C. generator 47 is connected with plates 222, 223 through the circuit indicated by continuous lines with dots thereon. This circuit includes a connection with grounded resistance R39 (connected with a terminal of generator 47 and with condenser C12), amplifier tubes V12 and V8, plates 222, 223 and amplifier tube V7 to ground. As the timer speed increases, the output of the D. C. generator 47 increases. The circuit including condenser C12 and resistance R39 provide that the voltage impressed on the plates 222 and 223 through amplifier tubes V8 and V7 shall increase in proportion to speed increase.

Since oscilloscope plates 220, 221 receive voltage signals in proportion to spark advance and plates 222, 223 receive voltage signals in proportion to timer shaft speed, there appears on the oscilloscope screen 224 a trace of the spark advance curve. This trace appears more or less continuous depending on the rate of acceleration of the timer shaft. The inspector can see whether the trace falls in a zone between two limit curves marked on the screen 224. If any part of the trace falls outside the zone, the timer does not pass inspection for spark advance.

The test for spread is to determine the synchronism of sparking. A perfectly synchronized timer should provide sparks at equally spaced intervals. For example, a conventional four cycle, six cylinder engine would require a spark every 120° of crankshaft rotation or every 60° of camshaft rotation. Due to slight variations in manufacture (cam contour for example), the intervals between sparking may vary from 60° slightly. The timer is serviceable if the variation is not too great. The variation is called spread.

To test for spread, the timer is rotated at constant speed and the switch S1 is closed to connect a current source through connections ww with the magnet coil 210 of relay RE3 and the source with coil 225 of relay RE2. The energization of coil 225 causes relay RE2 to condition the oscilloscope for the spread test, by disconnecting its element 226 from the contact 227 of relay RE2 and connecting said element with contact 228. This makes the intensity of return trace only slightly visible. Only the peak is plainly visible. The energization of coil 210 causes relay RE3 to separate contacts 211 and 212, contacts 202, 203 and contacts 206, 207 and to engage contacts 203, 209, contacts 211, 213 and contacts 207, 208. Then a spread circuit represented by lines with small circles at one side thereof will be established. This circuit includes a connection with rectifier cells 230 connected with transformer T3, the closed contacts 211 and 213 of relay RE3, and the control grid of tube V11. While this circuit is completed, tube V11 is biased to draw plate current near midway of the voltage plate current curve. When the timer contacts 204 open, the timer condenser Ct receives a charge from rectifier 230; and, immediately thereafter, the negative voltage stored in condenser Ct is discharged across R17 which increases negative bias voltage on V11 which changes the plate current of V11 momentarily. When tube V11 is receiving this added bias voltage, there appears on the screen 224 a bright spot which is the peak of the wave resulting from the discharge of condenser Ct across resistance R17. When the timer contacts 204 close the spot disappears because tube V11 is now biased where it drives the spot off the screen 224. Resistance R34 is preset by relay RE2 so the trace of spot leaving the screen is not visible. If the intervals between timer contact separation are exactly equal, the spots will coincide. If timing intervals are not equal, the charges of condenser Ct are unequal. Therefore the voltages developed across R17 are unequal and the peaks of the discharge waves are at different elevations on the screen. The distance between lowest and highest spots is an indication of spread. If the spread is between certain limit marks on the screen, the timer passes the spread test.

The plates of tubes V11 and V12 receive a voltage from a source including transformer T6, rectifier tube V14, a filter circuit (chokes H3 and H4 and condensers C10 and C11) and a voltage regulator tube V16. The control grid of tube V11 receives a fixed bias from a source including transformer T6, rectifier tube V13, a filter circuit (resistance R12 and condensers C8 and C9) and a voltage regulator tube V15. When the circuit indicated by small circles adjacent lines is closed by relay RE3 and timer contacts 204, tube V11 receives added bias which decreases its plate current. When timer contacts separate, the added bias is eliminated and tube V11 again draws more plate current. Hence a spot appears on the screen 224 when the timer contacts separate.

Transformer T7 regulates voltage between lines 1 and 2 to which the primary winding of transformers T1, T2, T3, T4, T5, T6, T7, T8, T9, T10, T12, T13 and T15 are connected. Switch SW3 connects a current source (110 volt A. C.) with lines 1 and 2. Line 1 is connected with line 1a by a time delay relay RE1 comprising a thermal switch 240 influenced by a heater 241 connected with lines 2 and 1 through normally closed contacts 242 of relay RE1. After a lapse of time, switch 240 closes to connect coil 243 with lines 2 and 1. When coil 243 is energized, contacts 244 and 245 are closed and contacts 242 open. The heater 241 is open circuited; coil 243 is connected with lines 1 and 2 by contacts 244; and, lines 1 and 1a are then connected by contacts 245 and the primary coils of transformers T11 and T14 are connected with lines 1 and 2. The purpose of the time delay is to withhold operation of the apparatus for supplying amplifier voltage and gun voltage until the tube cathodes have been heated.

The power supply which includes transformer T8 and rectifier cells 250 supplies current through connections xx, to the filaments of tubes V11, V10, V9. The power supply which includes transformer T9 and rectifier cells 251 supplies current through connections YY to the filaments of tubes V12, V8, V7. Transformer T5 supplies current through connections zz to the filament of tube V5.

The voltage supply for the plates of tubes V10, V9, V8, V7 includes transformers T10, T11, T12, rectifier tubes V17, V18, V19, V20 and filter circuit including chokes H5, H6 and condensers C15, C16.

The gun voltage supply for cathode ray oscilloscope V6 includes transformers T13, T14, T15 and rectifier tubes V21, V22.

Lamp L2 burns to indicate closing of switch SW3. Lamp L1 burns to indicate that lines 1 and 1a have been connected by relay RE1.

While the embodiment of the present invention as herein disclosed, constitutes a preferred form, it is to be understood that other forms might be adopted, all coming within the scope of the claims which follow.

What is claimed is as follows:

1. Apparatus for testing an ignition timer having a cam, a pair of contacts separated by the cam, a condenser in parallel with the contacts and speed responsive means for obtaining spark advance by advancing the cam angularly relative to the timer driving shaft as speed increases, comprising a thyratron, a voltage source for the thyratron plate, means for intermittently connecting the voltage source with the plate and comprising a non-conducting disc driven at the speed of the timer drive shaft and having equidistant conducting segments equal in number to the lobes of the timer cam, means for connecting the segments with a terminal of the voltage source and a brush engageable successively with the segments and connected with the thyratron plate, means for adjusting the timer housing to a position such that at the beginning of the spark advancing function, the timer contacts open just as a segment leaves the brush, a source of negative bias voltage connected with the thyratron grid and causing the thyratron to be non-conducting, means responsive to the opening of the timer contacts for so reducing "negatively" the thyratron grid bias that the thyratron becomes conducting in consequence of which the thyratron conducts current for successive periods increasing in duration as spark advance increases and the current waves passed by the thyratron increase in width, means for averaging the current flow, a resistance element subjected to the averaged current flow, a connection with the resistance element which receives a voltage signal which increases in magnitude as spark advance increases, signal amplifying means, a cathode ray oscilloscope, one pair of which plates receive the amplified voltage signal, means for impressing upon the other plates of the oscilloscope a voltage signal corresponding to speed of the timer drive shaft, said means comprising a D. C. generator rotating with the timer shaft, resistance-capacitance circuit connected with the generator for passing a voltage signal which increases in magnitude as generator output increases and means for amplifying said signal and passing it to said other pair of plates of the oscilloscope, and means for driving the generator, timer and disc at various speeds whereby the spark advance curve of the timer appears on the screen of the oscilloscope.

2. Apparatus according to claim 1 further characterized by a means responsive to the opening of the timer contacts for reducing "negatively" thyratron grid bias which comprises a breaker supply circuit including the timer contacts, the timer condenser, a timer condenser charging source and the primary winding of a transformer whose secondary is connected in the circuit of the thyratron grid and its biasing source, the opening of the timer contacts causing the timer condenser to receive a charge and then to discharge through the primary winding of the transformer.

3. Apparatus according to claim 1 in which one end of the resistance element is connected with the cathode of the thyratron and in which the means for averaging current includes two impedances connected in series with the thyratron cathode and includes a condenser connected between the impedances and the other end of the resistance element.

4. Apparatus according to claim 1 further characterized by a spread circuit including the timer contacts, the timer condenser, a timer condenser charging source and a resistance which is subjected to condenser discharge when the timer contacts open, a connection between the resistance and the signal amplifying means first mentioned in claim 1, means for effecting disconnection of the timer contacts and condenser from the breaker supply circuit and the connection of the same with the spread circuit, and means for conditioning the oscilloscope for rendering more visible on its screen the peak of the wave of timer condenser discharge than other portions of the wave.

FLOYD J. FOUST.
OLVEN W. CHILDRESS, Jr.
RUPERT C. WHELCHEL.

REFERENCES CITED

The following references are of record in the file of this patent:

UNITED STATES PATENTS

| Number | Name | Date |
| --- | --- | --- |
| 2,263,859 | Eldredge | Nov. 25, 1941 |
| 2,312,778 | Short | Mar. 2, 1943 |